United States Patent [19]

Tatemoto et al.

[11] 4,094,826
[45] June 13, 1978

[54] FLUORINATED GRAFT CATION EXCHANGE COPOLYMERS

[75] Inventors: Masayoshi Tatemoto, Ibaraki; Sinji Tamaru, Suita, both of Japan

[73] Assignee: Daikin Kogyo Co., Ltd., Osaka, Japan

[21] Appl. No.: 827,018

[22] Filed: Aug. 23, 1977

[30] Foreign Application Priority Data

Aug. 25, 1976 Japan .................................. 51-102113

[51] Int. Cl.$^2$ .............................................. C08F 259/08
[52] U.S. Cl. .................................... 260/2.2 R; 260/884
[58] Field of Search ............................. 260/2.2 R, 884

[56] References Cited

U.S. PATENT DOCUMENTS 3,839,172  10/1974  Chapiro et al. ................. 204/159.17

OTHER PUBLICATIONS

CA, 17, 23441m (1971).

*Primary Examiner*—Stanford M. Levin
*Attorney, Agent, or Firm*—Armstrong, Nikaido, Marmelstein & Kubovcik

[57] ABSTRACT

Ion exchanger comprising a water-insoluble copolymer prepared by post-polymerizing at least one fluoroolefin monomer to a perfluorovinylacetic acid-vinylidene fluoride copolymer containing not less than 25% by mole of the perfluorovinylacetic acid unit in an aqueous solution of said copolymer in the presence of an organic or inorganic peroxide. The ion exchanger has excellent heat and chemical resistances and dimensional stability.

10 Claims, 1 Drawing Figure

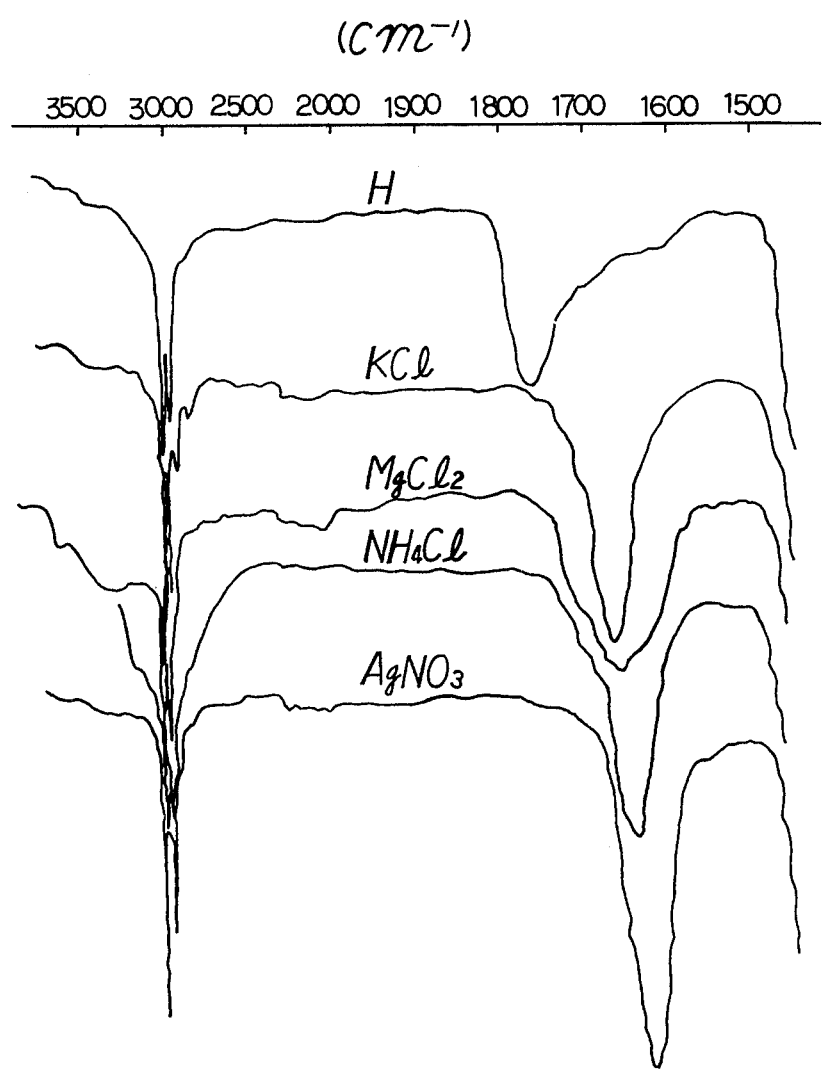

FLUORINATED GRAFT CATION EXCHANGE COPOLYMERS

BACKGROUND OF THE INVENTION

The present invention relates to an ion exchanger, and more particularly to an ion exchanger which comprises a water-insoluble copolymer obtained by postpolymerizing a fluoroolefin in an aqueous solution of a copolymer of not less than 25% by mole of perfluorovinylacetic acid and vinylidene fluoride.

Ion exchangers are extensively employed in various fields, for instance, desalination of seawater to fresh water, diaphragm process and waste water disposal, and various ion exchangers are developed in compliance with the purposes. In particular, a copolymer of a fluoroolefin and a perfluoroalkylvinyl ether containing sulfonic acid group is known as an ion exchanger having the heat and chemical resistances. However, perfluoroalkylvinyl ethers are very expensive and this ion exchanger has the economic disadvantage. Also, various methods of introducing ion-exchange groups to fluoroolefin polymers for this purpose are known, but have the disadvantage that the products may cause strain, since the fluoroolefin polymers generally have a high crystallinity and the introduction of the ion-exchange groups is liable to occur at the non-crystalline part.

The present inventors have found that a vinylidene fluoride-perfluorovinylacetic acid copolymer containing not less than 25% by mole of the perfluorovinylacetic acid unit has the ion-exchange capacity. However, this polymer is water-soluble and, therefore, cannot be employed as an ion exchanger.

OBJECTS OF THE INVENTION

It is an object of the present invention to provide an ion exchanger.

A further object of the invention is to provide an ion exchanger having excellent heat and chemical resistances and dimensional stability.

Another object of the invention is to provide a process for preparing an ion exchanger.

These and other objects of the invention will become apparent from the description hereinafter.

BRIEF DESCRIPTION OF THE DRAWING

The single FIGURE is infrared absorption spectra of the ion exchanger of the present invention and various salts thereof.

DETAILED DESCRIPTION

It has now been found that the above-mentioned objects can be attained by post-polymerizing at least one fluoroolefin monomer to a vinylidene fluoride-perfluorovinylacetic acid copolymer containing not less than 25% by mole of the perfluorovinylacetic acid unit. The thus obtained copolymer has a sufficient water resistance and can be employed as an excellent ion exchanger.

It is necessary that the vinylidene fluoroperfluorovinylacetic acid copolymer employed in the present invention contains not less than 25% by mole of the perfluorovinylacetic acid unit. This copolymer containing not less than 25% by mole of the perfluorovinylacetic acid unit is water-soluble, and the viscosity change thereof observed upon measuring the intrinsic viscosity shows a pattern peculiar to a polyelectrolyte. However, the vinylidene fluoride-perfluorovinylacetic acid copolymer containing more than 50% by mole of the perfluorovinylacetic acid unit is hard to prepare. Therefore, the copolymer containing 25 to 50% by mole of the perfluorovinylacetic acid unit is preferably employed in the present invention. The copolymer containing less than 25% by mole of the perfluorovinylacetic acid unit is not suitable for use in the postpolymerization, since such a copolymer is slightly soluble or insoluble in water. The vinylidene fluorideperfluorovinylacetic acid copolymer is prepared by copolymerizing vinylidene fluoride and perfluorovinylacetic acid in the presence of a known organic or inorganic peroxide polymerization initiator at a temperature of 0° to 150° C. for several tens of minutes to several tens of hours under an autogeneous pressure of vinylidene fluoride or a pressure of less than the autogeneous pressure. The polymerization can be carried out in a manner of a bulk, solution, suspension or emulsion polymerization. Typical examples of the organic and inorganic peroxide polymerization initiator are organic peroxides containing perfluoro- or perfluorochloro-alkyl groups such as perfluoro (or perfluorochloro)alkanoic acid peroxides and di[perfluoro(or perfluorochloro)acyl] peroxides, e.g. those shown by the following formula: $[Cl(CF_2CFCl)_nCF_2CO]_2O_2$ wherein $n$ is an integer of 1 to 3, diisopropyl peroxydicarbonate, ammonium persulfate and hydrogen peroxide. It is preferable to carry out the polymerization in the presence of a small amount of an iodine-containing saturated or unsaturated halogenated hydrocarbon such as 4-iodo-5-chloroperfluoropentene-1, 1-iodoperfluoropropane or 1-iodoperfluorobutane, because of making the post-polymerization easy. The iodine-containing halogenated hydrocarbon acts as a telogen. The produced telomer also acts as a telogen and, therefore, the molecular weight of the resulting polymer successively increases. Since the molecular weight of the polymer and the viscosity of the polymerization reaction mixture increase, there is preferably carried out a multistage polymerization in which the diluted polymerization reaction mixture is employed in the polymerization at the next stage.

An aqueous solution of the vinylidene fluorideperfluorovinylacetic acid copolymer is employed in the preparation of the ion exchanger of the present invention. The aqueous solution having a concentration of 5 to 30% by weight is usually employed. The vinylidene fluorideperfluorovinylacetic acid copolymer containing not less than 25% by mole of the perfluorovinylacetic acid unit is hereinafter referred to as the "copolymer at the first stage". The ion exchanger is prepared by postpolymerizing at least one fluoroolefin monomer to the vinylidene fluoride-perfluorovinylacetic acid copolymer containing not less than 25% by mole of the perfluorovinylacetic acid unit in an aqueous solution of the copolymer in the presence of a known organic or inorganic peroxide polymerization initiator at a temperature of 0° to 150° C. for several tens of minutes to several tens of hours under an autogeneous pressure of the monomer or monomers or a pressure of less than the autogeneous pressure. The post-polymerization is carried out in a manner of a suspension or emulsion polymerization. The resulting copolymer is water-insoluble, and is obtained in the form of an aqueous dispersion thereof. Examples of the fluoroolefin monomer employed in the present invention are tetrafluoroethylene, trifluoroethylene, trifluorochloroethylene, hexafluoropropylene, vinylidene fluoride and vinyl fluoride. Ethylene is also available when it is employed in combination with tetrafluoroethylene or trifluorochloroethylene. Typical examples of the organic and inorganic peroxide polymerization initiator employed in the post-polymerization are organic peroxides containing perfluoro- or perfluorochloro-alkyl groups such as perfluoro(or perfluorochloro)alkanoic acid peroxides and di[perfluoro(or perfluorochloro)acyl] peroxides, diisopropyl peroxydicarbonate, ammonium persulfate and hydrogen peroxide, as employed in the preparation of the copolymer at the first stage. The proportion of the post-polymerized monomer(s) is from 5 to 60% by weight, preferably from 20 to 40% by weight, based on the weight of the copolymer at the first stage. When the proportion is less than 5% by weight, the resulting copolymer is not completely water-insoluble and is also poor in the dimensional stability. When the proportion is more than 60% by weight, the electric conductivity of the resulting copolymer becomes extremely low and the copolymer cannot be employed as a satisfactory ion exchanger. Also, the finally produced water-insoluble copolymer having an average molecular weight of 30,000 to 1,000,000, preferably 100,000 to 500,000 is well suited for ion exchanger.

A film may be formed from the thus obtained aqueous dispersion by a casting method, and also a film or sheet may be formed by separating the copolymer from the aqueous dispersion and forming in a usual manner.

The water-insoluble copolymer of the present invention is the strongly acidic cation exchange resin and has excellent heat and chemical resistances and dimensional stability and, therefore, can be suitably employed as an ion exchanger.

The present inventors have also found that some of these water-insoluble copolymers show the reversible change in expansion and contraction in compliance with the change of an electrolyte concentration in an electrolytic solution and can be employed as a mechanochemical system. The water-insoluble copolymer having the proportion of 2 to 30% by weight, preferably 5 to 20% by weight, of the post-polymerized monomer(s) based on the weight of the copolymer at the first stage is suitably employed as the mechanochemical system.

The water-insoluble copolymer of the present invention can be employed without cross-linking it, but as occasion demands, it may be cross-linked by cross-linking agents, which are generally employed in cross-linking polymers containing vinylidene fluoride, such as diamine derivatives, bisphenols and peroxides.

The present invention is more particularly described and explained by means of the following Examples. To illustrate the preparation of perfluorovinylacetic acid, the following Reference Example is also given.

REFERENCE EXAMPLE 1,2,4,4-Tetrachloro-1,1,2,3,3,4-hexafluorobutane ($ClCF_2$—$CFCl$—$CF_2$—$CFCl_2$) obtained by the telomerization of chlorotrifluoroethylene using sulfuryl chloride as a telogen was subjected to chlorination in the presence of aluminum chloride in carbon tetrachloride to give 1,2,4,4,4-pentachloro-1,1,2,3,3-pentafluorobutane.

A one liter flask was charged with 670 g. of a 30% by weight fuming sulfuric acid and 3 g. of mercury, and the temperature was raised to 120° C. To the flask, 641 g. of 1,2,4,4,4-pentachloro-1,1,2,3,3-pentafluorobutane was added dropwise over one hour, and further reacted at the same temperature under reflux conditions for 5 hours. After hydrolyzing with a 70% by weight sulfuric acid, the reaction mixture was subjected to distillation until sulfuric acid was distilled off to give 346 g. of crude 3,4-dichloro-2,2,3,4,4-pentafluorobutyric acid ($ClCF_2$—$CFCl$—$CF_2COOH$).

Then, 98 g. of zink dust was suspended in 200 ml. of water in a one liter flask, and after adding 247 g. of 3,4-dichloro-2,2,3,4,4-pentafluorobutyric acid thereto, the reaction was carried out under reflux conditions for 5 hours. The resulting supernatant liquid of the reaction mixture was separated and 120 ml. of a 70% by weight sulfuric acid was added thereto to separate into two layers. The under layer was separated and then subjected to rectification to give 112 g. of perfluorovinylacetic acid ($CF_2$=$CF$—$CF_2COOH$).

EXAMPLE 1

A three liter autoclave equipped with a stirrer was charged with one liter of demineralized water and 0.2 g. of ammonium persulfate. After thoroughly replacing air within the autoclave with vinylidene fluoride, 48 g. of perfluorovinylacetic acid was added to the autoclave. Then, the temperature was maintained at 60° C. and vinylidene fluoride was supplied to the autoclave by pressure until the inner pressure reached 29 kg./cm.$^2$G. Since the pressure dropped with the progress of the polymerization, vinylidene fluoride was further supplied to the autoclave at intervals of the pressure drop of 2 kg./cm.$^2$G. to maintain the inner pressure at 29 kg./cm.$^2$G. After 5 hours the polymerization was stopped, and after recovering vinylidene fluoride, the reaction mixture was taken out from the autoclave.

The reaction mixture was an 11% by weight aqueous solution of vinylidene fluoride-perfluorovinylacetic acid copolymer which contained on the average 26% by mole of the perfluorovinylacetic acid unit.

A 200 ml. autoclave was charged with 100 ml. of an 11% by weight aqueous solution of vinylidene fluoride-perfluorovinylacetic acid copolymer containing 26% by mole of the perfluorovinylacetic acid unit and 0.01 g. of ammonium persulfate. After thoroughly replacing air within the autoclave with pure nitrogen and further with tetrafluoroethylene, the temperature was raised to 40° C. and tetrafluoroethylene was supplied to the autoclave by pressure until the inner pressure reached 5 kg./cm.$^2$G. During the post-polymerization, tetrafluoroethylene was further supplied to the autoclave at intervals of the pressure drop of 1 kg./cm.$^2$G. to maintain the inner pressure at 5 kg./cm.$^2$G. The postpolymerization was continued until 4.5 g. of tetrafluoroethylene was consumed, and after recovering tetrafluoroethylene, the reaction mixture was taken out from the autoclave. The reaction mixture was an aqueous suspension of a copolymer in which about 30% by weight of tetrafluoroethylene was post-polymerized on the vinylidene fluoride-perfluorovinylacetic acid copolymer.

EXAMPLE 2

(1) A 200 ml. pressure resisting glass lining reactor was charged with 50 ml. of water, 10 ml. of perfluorovinylacetic acid, 4-iodo-5-chloroperfluoropentene-1 ($CF_2$=$CF$—$CF_2$—$CFI$—$CF_2Cl$) and 0.1 g. of ammonium persulfate at a temperature of 20° C. After thoroughly replacing air within the reactor with vinylidene fluoride, the temperature was raised to 60° C. and vinylidene fluoride was supplied to the reactor by pressure until the inner pressure reached 29 kg./cm.$^2$G.

Since the pressure dropped with the progress of the polymerization, during the polymerization vinylidene fluoride was further supplied to the reactor to maintain the inner pressure at 29 kg./cm.$^2$G. The polymerization was carried out for 3 hours. The resulting reaction mixture was a transparent aqueous solution which was viscous to some extent.

The polymer could be recovered from the reaction mixture by coagulating with hydrochloric acid. Since the polymer could be again dissolved in water, the polymer was purified by separating the unreacted perfluorovinylacetic acid in this manner. The yield of the polymer was 6.9 g. and the content of the perfluorovinylacetic acid was 42% by mole.

(2) A 200 ml. pressure resisting glass lining reactor was charged with 10 ml. of the aqueous solution obtained in the above item (1), 7.5 ml. of perfluorovinylacetic acid, 50 ml. of pure water and 40 mg. of ammonium persulfate, and thereafter the polymerization was carried out for 4.2 hours in the same manner as in the above item (1). The resulting reaction mixture was a viscous transparent aqueous solution.

The polymer was purified in the same manner as in the above item (1). The yield of the polymer was 6.7 g. and the content of perfluorovinylacetic acid was 41% by mole.

(3) The procedures of the above item (2) were repeated except that the aqueous solution obtained in the above item (2) was employed and the polymerization was carried out for 8 hours. The resulting reaction mixture was a highly viscous transparent aqueous solution.

The yield of the polymer was 8.1 g. and the content of perfluorovinylacetic acid was 39% by mole.

(4) Twenty milliliters of the aqueous solution obtained in the above item (3) was diluted with water to about 100 ml, and thereto was added dropwise about 20 ml. of 4N-hydrochloric acid under vigorous agitation to precipitate the polymer. The precipitated polymer was an elastic gel-like material. Since it contained hydrochloric acid, the liquid contained therein was squeezed out by compression and the gel-like material was again dissolved in 100 ml. of pure water. After repeating this procedure further 2 times, the polymer was washed with a small amount of water and dried at 60° C. for several hours. The polymer was free from the hydrochloric acid odor.

The thus obtained polymer was dissolved in 50 ml. of pure water, and pure nitrogen was bubbled for 30 minutes through the resulting aqueous solution. A 200 ml. pressure resisting glass lining reactor was charged with the aqueous solution and 5 mg. of ammonium persulfate. After thoroughly replacing air within the reactor with vinylidene fluoride, the post-polymerization of vinylidene fluoride was carried out at a temperature of 30° C. for 2.5 hours under a pressure of 10 kg./cm.$^2$G. During the post-polymerization, the pressure was maintained at 10 kg./cm.$^2$G. by supplying vinylidene fluoride to the reactor. After the polymerization was stopped by releasing vinylidene fluoride, the reaction mixture was taken out from the reactor. The reaction mixture was an aqueous dispersion of a copolymer in which about 30% by weight of vinylidene fluoride was post-polymerized on the vinylidene fluoride-perfluorovinylacetic acid copolymer.

Films were formed from the thus obtained aqueous dispersion by a casting method, and then treated with aqueous solutions of various salts, i.e. potassium chloride, magnesium chloride, ammonium chloride and silver nitrate. Then, the infrared absorption spectra of the non-treated film and the treated films were measured. The results thereof are shown in the attached drawing wherein H represents the infrared absorption spectrum of the non-treated film, namely the ion exchanger of the present invention, and KCl, $MgCl_2$, $NH_4Cl$ and $AgNO_3$ represent the infrared absorption spectrum of the film treated with the aqueous solution thereof, respectively. From the fact that the absorption of carboxyl group at 1760 cm.$^{-1}$ disappears due to the salt formation by the treatment with the aqueous solution of the salt and that the dependence on the concentration of salt with respect to the disappearance is not observed within the range of $1 \times 10^{-4}$ to 1N of the salt concentration of the aqueous solution at pH 7, it is clear that the ion exchanger of the present invention has the strongly acidic cation exchange capacity.

What we claim is:

1. An ion exchanger which comprises a water-insoluble copolymer prepared by post-polymerizing at least one fluoroolefin monomer selected from the group consisting of tetrafluoroethylene, trifluoroethylene, trifluorochloroethylene, hexafluoropropylene, vinylidene fluoride and vinyl fluoride to a perfluorovinylacetic acid-vinylidene fluoride copolymer containing not less than 25% by mole of the perfluorovinylacetic acid unit in an aqueous solution of said perfluorovinylacetic acid-vinylidene fluoride copolymer in the presence of an organic or inorganic peroxide polymerization initiator wherein the proportion of the post-polymerized fluoroolefin monomer is from 5 to 60% by weight based on the weight of said perfluorovinylacetic acid-vinylidine fluoride copolymer.

2. The ion exchanger of claim 1, wherein said perfluorovinylacetic acid-vinylidene fluoride copolymer contains 25 to 50% by mole of the perfluorovinylacetic acid unit.

3. The ion exchanger of claim 1, wherein the post-polymerization is carried out at a temperature of 0° to 150° C. under an autogeneous pressure of said monomer or a pressure of less than the autogeneous pressure.

4. The ion exchanger of claim 1, wherein said proportion is from 20 to 40% by weight.

5. The ion exchanger of claim 1, wherein said perfluorovinylacetic acid-vinylidene fluoride copolymer containing not less than 25% by mole of the perfluorovinylacetic acid unit is prepared by copolymerizing vinylidene fluoride and perfluorovinylacetic acid in the presence of an organic or inorganic peroxide polymerization initiator at a temperature of 0° to 150° C. under an autogeneous pressure of vinylidene fluoride or a pressure of less than the autogeneous pressure.

6. The ion exchanger of claim 5, wherein the copolymerization is carried out in the presence of a small amount of an iodine-containing saturated or unsaturated halogenated hydrocarbon.

7. The ion exchanger of claim 6, wherein said iodine-containing saturated or unsaturated halogenated hydrocarbon is a member selected from the group consisting of 4-iodo-5-chloroperfluoropentene-1, 1-iodoperfluoropropane and 1-iodoperfluorobutane.

8. A process for preparing an ion exchanger which comprises after-polymerizing at least one fluoroolefin monomer selected from the group consisting of tetrafluoroethylene, trifluoroethylene, trifluorochloroethylene, hexafluoropropylene, vinylidene fluoride and vinyl fluoride to a perfluorovinylacetic acid-vinylidene fluoride copolymer containing not less than 25% by mole of the perfluorovinylacetic acid unit in an aqueous solution of said perfluorovinylacetic acid-vinylidene fluoride copolymer in the presence of an organic or inorganic peroxide polymerization initiator at a temperature of 0° to 150° C. under an autogeneous pressure of said monomer or a pressure of less than the autogeneous pressure, the proportion of the post-polymerized monomer being from 5 to 60% by weight based on the weight of said perfluorovinylacetic acid-vinylidene fluoride copolymer.

9. The process of claim 8, wherein said perfluorovinylacetic acid-vinylidene fluoride copolymer is prepared by copolymerizing vinylidene fluoride and perfluorovinylacetic acid in the presence of an organic or inorganic peroxide polymerization initiator at a temperature of 0° to 150° C. under an autogeneous pressure of vinylidene fluoride or a pressure of less than the autogeneous pressure.

10. The process of claim 9, wherein the copolymerization is carried out in the presence of a small amount of an iodine-containing saturated or unsaturated halogenated hydrocarbon selected from the group consisting of 4-iodo-5-chloroplerfluoropentene-1, 1-iodoperfluoropropane and 1-iodoperfluorobutane.

* * * * *